US012194729B2

(12) United States Patent
Schloerholz et al.

(10) Patent No.: US 12,194,729 B2
(45) Date of Patent: Jan. 14, 2025

(54) DEVICE FOR CURING A UV-CURABLE FLUID ON A PRINTING SUBSTRATE BY AN EMITTER

(71) Applicant: Heidelberger Druckmaschinen AG, Heidelberg (DE)

(72) Inventors: Matthias Schloerholz, Plankstadt (DE); Michael Kohlmann, Frankenthal (DE); Uwe Ernst, Mannheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 264 days.

(21) Appl. No.: 17/854,258

(22) Filed: Jun. 30, 2022

(65) Prior Publication Data

US 2023/0001713 A1 Jan. 5, 2023

(30) Foreign Application Priority Data

Jun. 30, 2021 (EP) .................................... 21182774

(51) Int. Cl.
*B41J 11/00* (2006.01)

(52) U.S. Cl.
CPC .... *B41J 11/00214* (2021.01); *B41J 11/00218* (2021.01)

(58) Field of Classification Search
CPC .......... B41J 11/00214; B41J 11/00218; B41M 7/0045; B41M 7/0081; B42D 25/41; B41F 23/0409; B41F 23/0453; B41F 23/04; B41F 23/0443; B41F 23/045
See application file for complete search history.

(56) References Cited

U.S. PATENT DOCUMENTS

| | | | | |
|---|---|---|---|---|
| 3,930,064 | A | 12/1975 | Sander | |
| 7,669,530 | B2 | 3/2010 | Aylor et al. | |
| 8,398,229 | B2 | 3/2013 | Vosahlo et al. | |
| 8,699,921 | B2 | 4/2014 | Petermann | |
| 2003/0035037 | A1* | 2/2003 | Mills | B41J 2/01 347/102 |
| 2005/0154075 | A1 | 7/2005 | Siegel | |
| 2012/0009351 | A1 | 1/2012 | Mackinnon et al. | |
| 2012/0128890 | A1* | 5/2012 | Mirchev | B41F 23/0409 427/493 |

FOREIGN PATENT DOCUMENTS

| | | | |
|---|---|---|---|
| CN | 101417535 | A | 4/2009 |
| CN | 207546940 | U | 6/2018 |
| CN | 111791611 | A | 10/2020 |
| DE | 2019270 | A1 | 11/1971 |
| EP | 1625016 | A1 | 2/2006 |
| EP | 2067620 | A2 | 6/2009 |
| EP | 2283934 | A2 | 2/2011 |
| EP | 2508255 | A1 | 10/2012 |
| GB | 1581998 | A | 12/1980 |

* cited by examiner

*Primary Examiner* — Bradley W Thies
(74) *Attorney, Agent, or Firm* — Laurence A. Greenberg; Werner H. Stemer; Ralph E. Locher

(57) ABSTRACT

A device cures a UV-curable fluid, such as offset or inkjet printing ink, on a substrate by way of an emitter. The emitter includes at least two flash lamps which are disposed in a row. This provides a cost-efficient way of evenly and homogeneously curing UV-curable printing fluids at low environmental impact. There is also described a printing machine with a device for curing UV-curable printing ink.

2 Claims, 6 Drawing Sheets

DEVICE FOR CURING A UV-CURABLE FLUID ON A PRINTING SUBSTRATE BY AN EMITTER

CROSS-REFERENCE TO RELATED APPLICATION

This application claims the priority, under 35 U.S.C. § 119, of European Patent Application EP 21182774, filed Jun. 30, 2021; the prior application is herewith incorporated by reference in its entirety.

FIELD AND BACKGROUND OF THE INVENTION

The invention relates to a device for curing a UV-curable fluid on a printing substrate by means of an emitter with a flash lamp.

The technical field of the invention is the field of the graphic industry, in particular the field of curing preferably polymerizable fluids such as (liquid) ink, varnish and/or primer on substrates/printing materials in the form of sheets, webs, foil, or labels, preferably made of paper, cardboard, paperboard, synthetic materials, metals, or composites. The curing effect is attained by applying electromagnetic radiation, in particular ultraviolet (UV) radiation, to the fluid. In this process, the fluid, i.e., at least the polymerizable portion thereof, is polymerized.

To create printed products in printing machines, various printing fluids may be applied to printing substrates, such as paper, cardboard, or foil. In general, these printing fluids are printing inks, varnishes, or combinations thereof. Once the fluids have been applied, the printed printing substrate is dried and/or cured in the printing machine. A common group of fluids is dried by removing the solvent, usually water. This process usually relies on infrared driers and hot-air driers provided in the printing machine. Another common group of printing fluids is cured under the influence of UV radiation or electron radiation. These fluids are frequently composites based on acrylates or other unsaturated compounds, which polymerize and thus cure under the influence of UV light or electron radiation, sometimes in the presence of one or more photo-initiators.

The curing process of UV-curable fluids in printing machines usually occurs in two stages. In a first step, the radiation-curable coating such as a UV ink or UV varnish is only partially cured. The partial curing is also referred to as pinning. For this purpose, the radiation-curable fluid is usually irradiated with a comparatively low dose of rather longer-wave UV radiation shortly after its application to the printing substrate. This sufficiently fixes the printed image for it to continue to be transported through the machine to receive printing fluids of different colors without any undesired alterations. Prior art pinning devices generally use LED lamps.

In a second step, usually at the end of the printing operation once all the colors have been applied to the printing substrate and the latter has been finished with a UV varnish if desired, the final curing takes place. Prior art final curing devices commonly use mercury vapor lamps, which emit particularly short-wave UV light of high intensity. Thus the curing reaction of the pinned radiation-curable fluid is completed or nearly completed. This results in cured printed products such as printed packaging, posters, or brochures, which may be used as intended without being sticky and without smearing.

In the printing industry, there is a demand for low-cost curing solutions that do not require mercury vapor lamps.

Xenon flash lamps are suitable for curing radically-curing color systems because such lamps have a wide emission spectrum including proportions of UV-A to UV-C radiation. There are various technical designs of xenon flash lamps; the most common one is the classic design with an elongated glass tube because this design has the highest optical power.

German published patent application DE 2019270 A1 discloses a method and a device for curing a coating applied to a body. A xenon flash tube is mentioned as a light source.

Xenon flash lamps with glass tubes may cover the format width of a printing machine. However, irradiation by periodic flashes may result in varying degrees of irradiation of different areas on the printing substrate in a direction transverse to the direction of the tube, i.e., in the printing direction or transport direction of the printing machine. Format-width flash lamps are difficult to actuate and operate. In addition, the complexity of actuating the power of xenon flash lamps increases with their size/length. The same applies to the installation space of the actuating device.

SUMMARY OF THE INVENTION

It is accordingly an object of the invention to provide a device for curing printing fluids and a printing machine which overcome the above-mentioned disadvantages of the heretofore-known devices and methods of this general type and which provides for an improvement over the prior art, in particular an improvement which provides even/homogeneous curing of UV curable printing fluids at low cost and at a low environmental impact.

With the above and other objects in view there is provided, in accordance with the invention, a device for curing a UV-curable fluid on a printing substrate. The novel device comprises:

an emitter disposed to irradiate the UV-curable fluid on the printing substrate;

the emitter having at least two flash lamps disposed in a row.

The invention advantageously provides even/homogeneous curing of UV-curable printing fluids at low cost and low environmental impact.

A flash lamp is preferably a gas discharge lamp which does not have continuous gas discharges but short pulsed discharges. During such a pulsed discharge, an energy storage device (e.g., a condenser) which has previously been charged is discharged in a very short time by the flash lamp. The flash lamp may preferably be of tubular design and may then be referred to as a flash tube or pulse tube.

The UV light of the flash lamp or lamps is preferably not focused to prevent energy densities that are too high and would therefore damage the fluid and/or the printing substrate and/or to prevent inhomogeneous curing when the printing substrate flutters.

The power of the emitter and/or of the individual flash lamps is preferably controllable, potentially in a closed control loop, in particular in such a way that optimum curing is achieved.

Individual flash lamps of the emitter may advantageously be exchanged, or instance if they fail. The emitter itself may remain in the device, for example.

Flash lamps of identical design may advantageously be used to form an emitter or several emitters. This may increase the quantity and reduce complexity and thus the inherent costs.

At least two of the flash lamps may be operated cyclically (in the flash mode) and at least another one of the flash lamps may be operated in a continuous mode (cw mode).

The fluid is a printing fluid, preferably (liquid) ink, varnish, and/or primer. The printing substrate is preferably a printing material in the form of sheets, webs, foil, or labels (i.e., substantially two-dimensional or flat), for instance made of paper, cardboard, synthetic materials, metal, or a composite material. Alternatively, it may be a three-dimensional body, for instance made of a synthetic material.

The following paragraphs describe preferred further developments of the invention.

In accordance with an added feature of the invention, the emitter comprises at least two flash lamps disposed in a further row or in that a further emitter comprises at least two flash lamps disposed in a further row. In this way, the power of the radiation may be adapted. The power of the radiation may alternatively or additionally be adapted by modifying the transport speed of the printing substrate. In accordance with a preferred feature, the flash lamps of a first row may merely have a partial curing effect on the fluid (known as pinning) whereas the flash lamps in a second row have the final curing effect on the fluid. Areas of high fluid densities on the printing substrate may preferably be cured by irradiating such areas with UV light multiple times, preferably with UV light emitted by multiple flash lamps in the direction of transport of the printing substrate.

In accordance with an additional feature of the invention, the flash lamps are designed as tubes, each tube having a longitudinal axis that extends in the direction of the tube.

In accordance with another feature of the invention, the flash lamps in the row and/or the flash lamps in the further row are disposed to be adjacent to one another without any mutual overlap between neighboring flash lamps. In accordance with an added feature of the invention, the longitudinal axes of the flash lamps are coaxial with one another. In accordance with yet an added feature of the invention, the longitudinal axes of the flash lamps are located on a straight line in the direction of the row. The straight line may preferably extend in a direction perpendicular to the direction of transport of the printing substrate. In accordance with yet an additional feature of the invention, the flash lamps are spaced apart from one another.

In accordance with again an added feature of the invention, the flash lamps in the row and/or the flash lamps in the further row are disposed to be adjacent to one another with mutual overlap between neighboring flash lamps. In accordance with a further feature of the invention, the longitudinal axes of every other one of the flash lamps are located on a first straight line in the direction of the row and the longitudinal axes of every further one of the flash lamps are located on a second straight line in the direction of the row, said two straight lines parallel and spaced apart from one another. The straight lines may preferably be perpendicular to a direction of transport of the printing substrate. A further development of the invention may be characterized in that the flash lamps on the first straight line are spaced apart from one another by a distance and the flash lamps on the second straight line are spaced apart from each other by the same distance. In accordance with an added feature of the invention, the flash lamps on the second straight line are disposed at the centers of the respective gaps between the flash lamps on the first straight line. In accordance with an added feature of the invention, a control device (potentially for closed-loop control) may be provided to set the distance by means of a motor in such a way that a specified curing effect is achieved in the fluid. The overlap may preferably be selected such that a homogeneous curing effect is attained.

The distance of the flash lamps (both in the alternative with overlap and in the alternative without overlap) may preferably be selected in such an advantageous way that the fluid on the printing substrate is substantially irradiated homogeneously, in particular in a direction perpendicular to the direction of transport of the printing substrate.

In accordance with yet another feature of the invention, the longitudinal axes of the flash lamps are disposed to be inclined relative to the direction of the row. Inclined flash lamps advantageously increase the duration of the irradiation of the fluid with UV light. This is advantageous in particular when the printing substrate is transported at high transport speeds. In accordance with an added feature of the invention, the inclination is adjustable/settable. In accordance with an added feature of the invention, the inclination is adjustable/settable by means of a motor. In accordance with an added feature of the invention, a control device (potentially for closed-loop control) is provided to adjust the inclination by means of a motor in such a way that a specified curing effect is attained in the fluid, for instance even for printing substrates of different formats. The adjustable inclination of the flash lamps may thus advantageously be used to adapt the emitter to different printing substrate formats.

A page-wide or format-wide emitter may preferably be formed by lining up multiple flash lamps, in particular flash tubes. Multiple flash lamps of identical construction may thus be used to create emitters for varying formats. In this context, a device for controlling the emitter may be formed of multiple device parts of identical construction to make use of the available installation space in a more effective way (in other words: many “small” controls instead of one “large” one). Such a modular system (“small” tubes with “small” controls) may advantageously be used to create emitters for various printing machines, i.e. for printing machines of different formats. They may include flash lamps with or without overlap and/or with or without inclination.

The number of flash lamps that are active in the curing operation (in the alternative without overlap, in the alternative with overlap, and in the alternative with inclination) may be changed by actuating different numbers of them to adapt them to varying formats of the printing substrate. For smaller formats, flash lamps at the beginning and at the end of the row may advantageously be switched off in a way corresponding to the format.

In accordance with a further feature of the invention, the longitudinal axes of the flash lamps are parallel to one another and preferably not coaxial with one another. In accordance with an added feature of the invention, the longitudinal axes of the flash lamps are perpendicular—or, in more general terms: at an angle other than 0° and 180°—to a straight line in the direction of the row. The straight line may preferably be parallel to a direction of transport of the printing substrate. In accordance with an added feature of the invention, the flash lamps are spaced apart from one another in the transport direction.

The printing substrate is advantageously transported at a distance from the emitter or emitters, preferably at a distance ranging between 35 mm and 75 mm, e.g., 55 mm. The printing substrate is advantageously transported for instance at a specified or modifiable transport speed and the flashes (or: pulses) of the flash lamps are preferably generated in an adapted cyclical manner such that the fluid on the printing substrate is irradiated in an essentially homogeneous way, in particular in the direction parallel to the direction of transport of the substrate.

In accordance with an added feature of the invention, a plurality of emitters is disposed in a curved plane. In accordance with an added feature of the invention, a plurality of rows is disposed in a curved plane. In accordance with an added feature of the invention, the curved plane is formed by a carrier for the emitters and/or for the rows. In accordance with an added feature of the invention, the curvature of the plane and/or of the carrier is variable, in particular by means of a flexible carrier. In this way, a curvature may, for instance, be adapted to a curvature of a cylinder holding and/or transporting the printing substrate. In accordance with an added feature of the invention, the curvature of the plane may be changed by means of a motor. In accordance with an added feature of the invention, a control device (potentially for closed-loop control) is provided to adjust the curvature by means of a motor in such a way that a specified curing effect is attained in the fluid.

In accordance with yet an added feature of the invention, the flash lamps are gas discharge lamps. In accordance with an added feature of the invention, the flash lamps are xenon flash lamps or krypton flash lamps. Xenon flash lamps advantageously have a wide UV spectrum and in addition are mercury-free.

With the above and other objects in view there is also provided, in accordance with the invention, a printing machine for applying a UV-curable fluid to a printing substrate and curing it thereon. The printing machine includes at least one device according to the invention as described above.

In accordance with an added feature of the invention, the printing machine is a printing press which applies offset printing inks. In accordance with an added feature of the invention, the printing machine is a printing machine which applies printing inks for inkjet printing. In accordance with an added feature of the invention, the printing machine is a printing machine which prints on essentially two-dimensional printing substrates and/or on essentially three-dimensional printing substrates (bodies). In accordance with an added feature of the invention, the printing machine is a printing machine which prints on sheets or webs of printing material.

In accordance with again an added feature of the invention, the sheets or webs are essentially conveyed in a direction of transport in the printing machine and in that the device is disposed in a transverse direction transverse to the direction of transport in the printing machine. In accordance with an added feature of the invention, the row is disposed perpendicular to the direction of transport. In accordance with an added feature of the invention, the flash lamps of the device, in particular the longitudinal axes thereof, are disposed in a transverse direction.

In accordance with again a further feature of the invention, the sheets or webs in the printing machine are conveyed essentially in a direction of transport and the device is disposed in the direction of transport. In accordance with an added feature of the invention, the row is disposed to be parallel to the direction of transport. In accordance with an added feature of the invention, the flash lamps of the device, in particular the longitudinal axes thereof, are disposed in a transverse direction transverse to the direction of transport. In accordance with an added feature of the invention, the device is of modular design and in that at least two modules, each one including at least one flash lamp, are disposed to be spaced apart from one another. In accordance with an added feature of the invention, three or more modules are provided. In accordance with an added feature of the invention, at least one module is disposed in a delivery or directly upstream (in the direction of transport) of a delivery of a sheet-fed printing machine. In accordance with an added feature of the invention, at least one further module is disposed in the delivery or upstream (in the direction of transport) of the delivery or in a printing unit or between two printing units. In accordance with an added feature of the invention, at least one module is disposed upstream of a varnishing unit or upstream of a location where varnish is applied. In accordance with an added feature of the invention, at least one module is disposed upstream of a printing unit for yellow ink or upstream of a location where yellow ink is applied.

In accordance with another feature of the invention, at least one flash lamp has an actual tube length or effective tube length which is equal to or greater than the printed width to be cured of the printing substrate. The effective tube length is preferably the length on the printing substrate which length is parallel to the longitudinal axis of the tube and is irradiated for curing. In simplified terms, a machine operator would refer to such flash lamps as page-wide or format-wide.

In the direction of transport of the printing substrate, every flash lamp preferably has a fixed interaction length on the printing substrate, in particular in a range from 0.1 m to 0.3 m, e.g., 0.2 m. The distance between the flash lamps in the direction of transport of the printing substrates is preferably an integer multiple of the interaction length or an integer multiple of the interaction length divided by the number of pulses when all flash lamps are operated in synchronism. In a corresponding way, this also applies to flash lamps that have an inclination.

The number of pulses required for the curing effect is preferably to be reached while the printing substrate is located in the region of the interaction length of the flash lamp or of the emitter with the flash lamp. The following is a numerical example: For a number of 4 pulses of a switch-on time of 2.5 ms each, at a substrate speed of 1 m/s, this is possible if the flash lamps are operated at a frequency of 20 Hz.

In accordance with a concomitant feature of the invention, the device generates a substantially homogeneous distribution of UV light in the transverse direction. In accordance with an added feature of the invention, the device generates an essentially homogeneous distribution of UV light in the direction of transport.

Any desired combination of the features and combinations of features disclosed in the above sections on the technical field, invention, and further developments as well as in the section below on exemplary embodiments likewise represents advantageous further developments of the invention.

Other features which are considered as characteristic for the invention are set forth in the appended claims.

Although the invention is illustrated and described herein as embodied in a device for curing a UV-curable fluid on a printing substrate by means of an emitter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
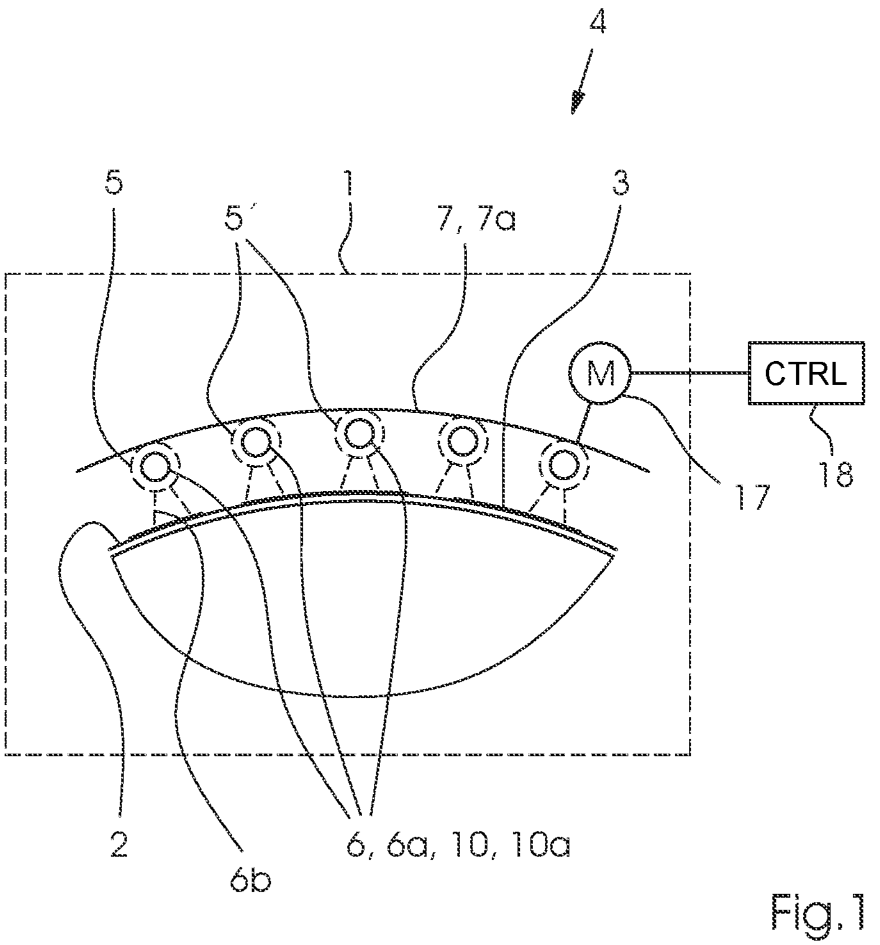
FIG. 1 is a schematic partial side view of an exemplary embodiment of the invention.

Repetitive reference symbols are left out in some of the drawing views for reasons of clarity.

DETAILED DESCRIPTION OF THE INVENTION

Referring now to the figures of the drawing in detail and first, in particular, to FIG. 1 thereof, there is shown a schematic side view of a preferred exemplary embodiment of a device of the invention. There is shown a printing machine 1 for printing on a flat printing substrate 2, such as paper, with a UV-curable fluid 3, for instance lithographic offset printing ink.

The printing machine comprises a device 4 for UV-curing according to the invention. By way of example, the device 4 has multiple emitters, namely an emitter 5 and at least one further emitter 5'. Every emitter comprises at least one flash lamp 6. The flash lamps may be embodied as tubes 6*a*, for instance as gas discharge tubes such as xenon flash lamps. The flash lamps generate UV radiation 6*b* to cure the printing fluid 3. As an example, the emitters are disposed along a curved plane 7 of a carrier 7*a*. The curvature of the plane is preferably adjustable (and thus adaptable to varying printing substrates 2 or transport cylinders). For this purpose, a motor 17 and an associated control device 18 for controlling the curvature of the carrier (potentially in a closed control loop) may be provided.

Figure 2:
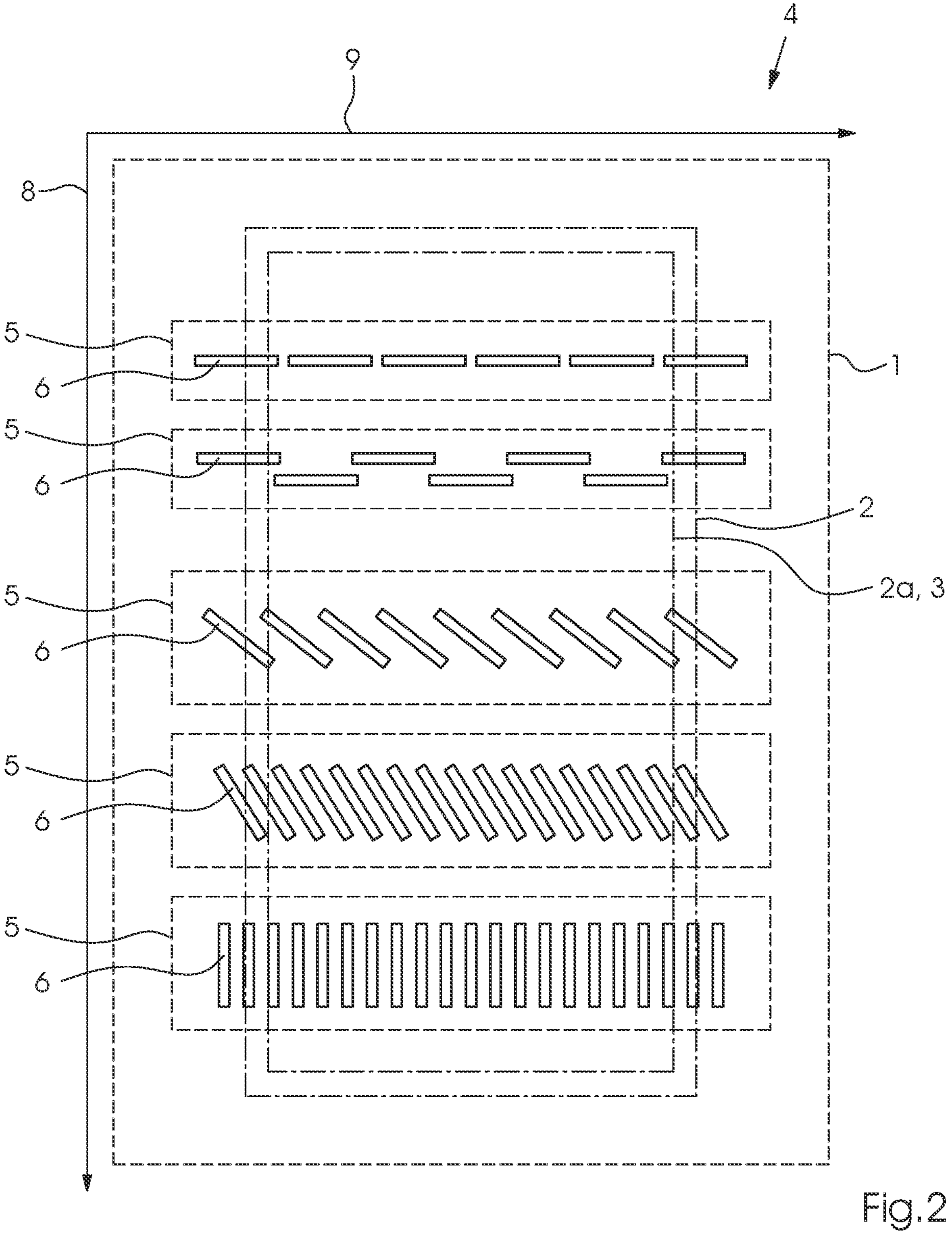
FIG. 2 is a schematic top view of a preferred exemplary embodiment of the device according to the invention.

FIG. 2 is a schematic top view of a preferred exemplary embodiment of a device according to the invention. There is shown the printing machine 1 and the printing substrate 2 with a printed image 2*a* of a printing fluid 3, as well as a device 4 of the invention.

The device 4 comprises at least one emitter 5. As an example, five different emitters 5 are shown. However, the device preferably only has emitters of identical construction. As shown, the flash lamps 6 of the emitters 5 may have different arrangements and/or orientations: For instance, (from top to bottom) coaxial, offset relative to one another, inclined at different angles, or parallel to one another. Details will be shown in the following figures.

The emitters 5 are preferably oriented in a direction transverse to a direction of transport 8 (of the printing substrate 2), i.e., in a transverse direction 9.

Figure 3:
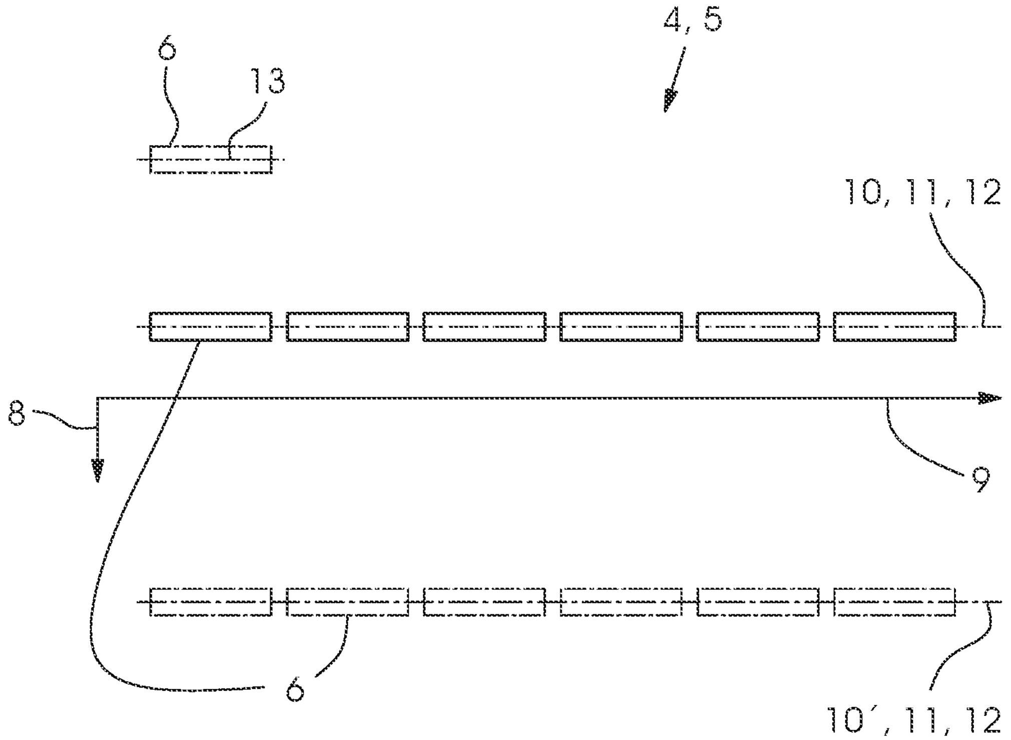
FIGS. 3-7 are schematic top views of several additional exemplary embodiments of a device according to the invention.

FIG. 3 is a schematic top view of a further preferred exemplary embodiment of a device of the invention. The top of the figure illustrates an example of a single flash lamp 6 to indicate its longitudinal axis. Below, a number of flash lamps 6 are shown. They are disposed to be coaxial to one another in a row 10. The row has a direction 11 parallel to the transverse direction 9. The longitudinal axes 13 of the flash lamps 6 are on a straight line 12 in the direction of the row 10. By way of an example, a further row 10' of the emitter 5 is shown.

Figure 4:
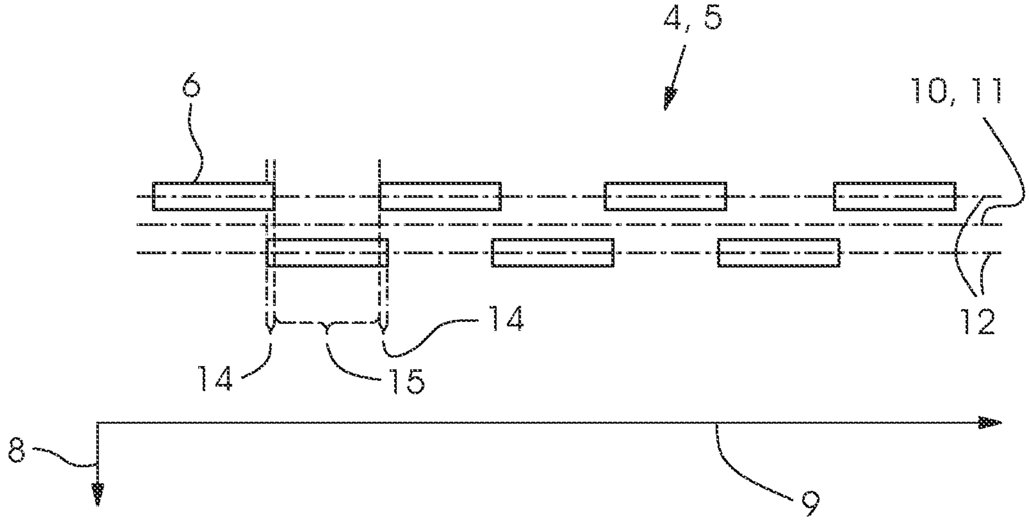

FIG. 4 is a schematic top view of a further preferred exemplary embodiment of a device of the invention. A number of flash lamps 6 are shown. They are disposed to be offset relative to one another in a row 10. The row has a direction 11 parallel to the transverse direction 9. The longitudinal axes 13 of the flash lamps 6 are on a second straight line 12 parallel to direction 11 in the direction of row 10. The flash lamps 6 arranged to be offset to one another on the two straight lines 12 are shown to have an overlap 14. The flash lamps 6 of a respective straight line 12 are further shown to be spaced apart from one another by a distance 15, i.e. there is a gap between them. Finally, the flash lamps 6 on one straight line 12 are shown to be disposed at the center of the respective gaps between the flash on the other straight line 12.

Figure 5:
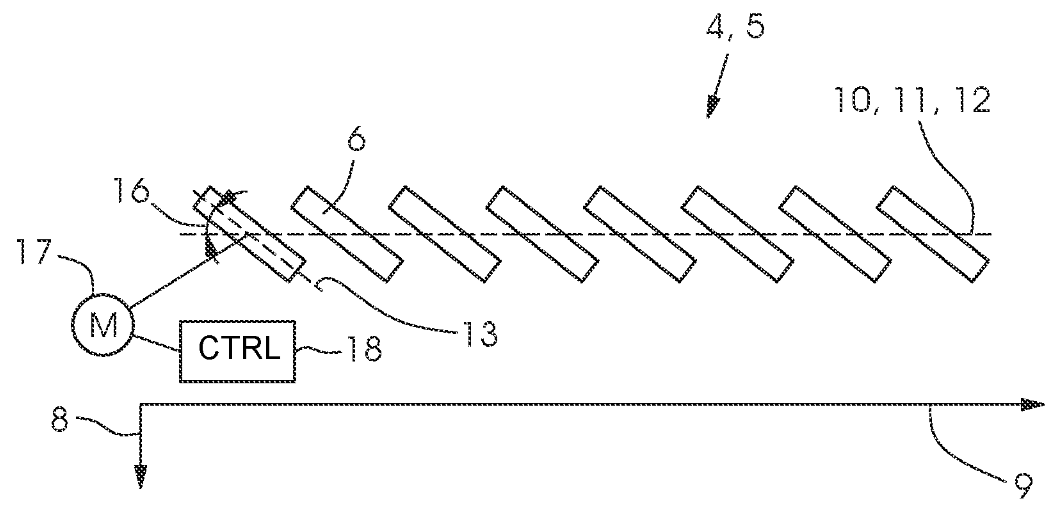

FIG. 5 is a schematic top view of a further preferred exemplary embodiment of a device of the invention. Multiple flash lamps 6 are shown. They are disposed in a row 10 and are inclined, i.e. each flash lamp has an inclination 16 (or an angle different than 0° and 180°) relative to the straight line 12. The row has a direction 11 parallel to the transverse direction 9. The inclination is shown to be adjustable. For this purpose, a motor 17 with a control device for controlling the motor/the inclination, potentially in a closed control loop, is provided.

Figure 6:
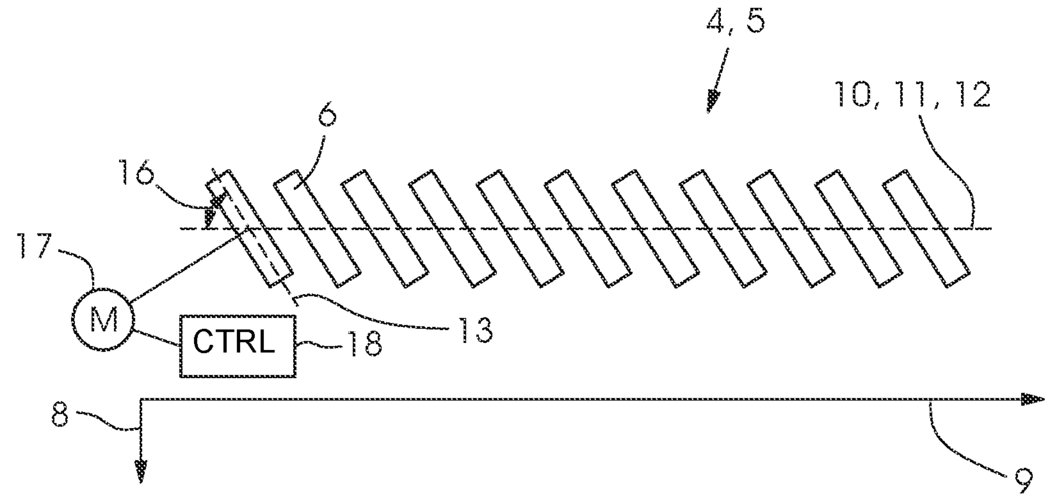

FIG. 6 is a further schematic top view of a further preferred exemplary embodiment of a device of the invention. Compared to FIG. 5, the flash lamps 6 are shown to have a different inclination 16.

Figure 7:
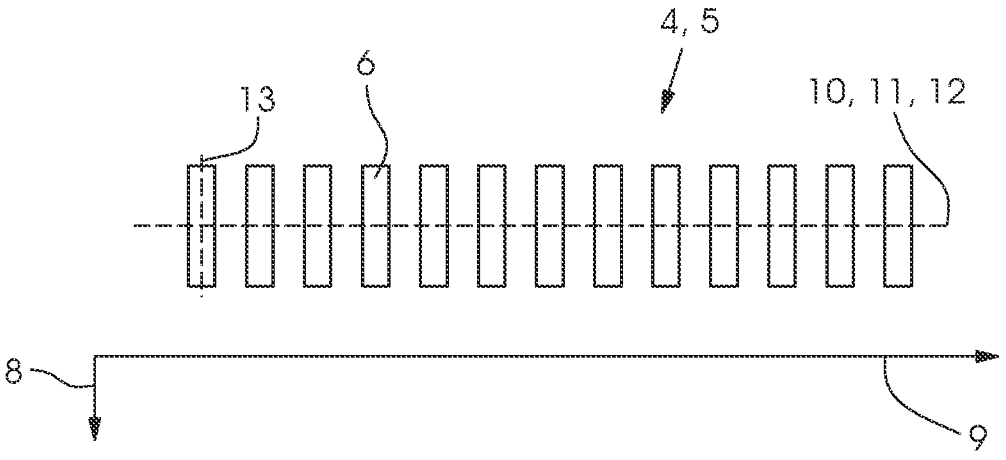

FIG. 7 is a further schematic top view of a further preferred exemplary embodiment of the invention. Here, the flash lamps/the longitudinal axes 13 thereof are shown to be oriented in parallel with the direction of transport 8.

Figure 8:
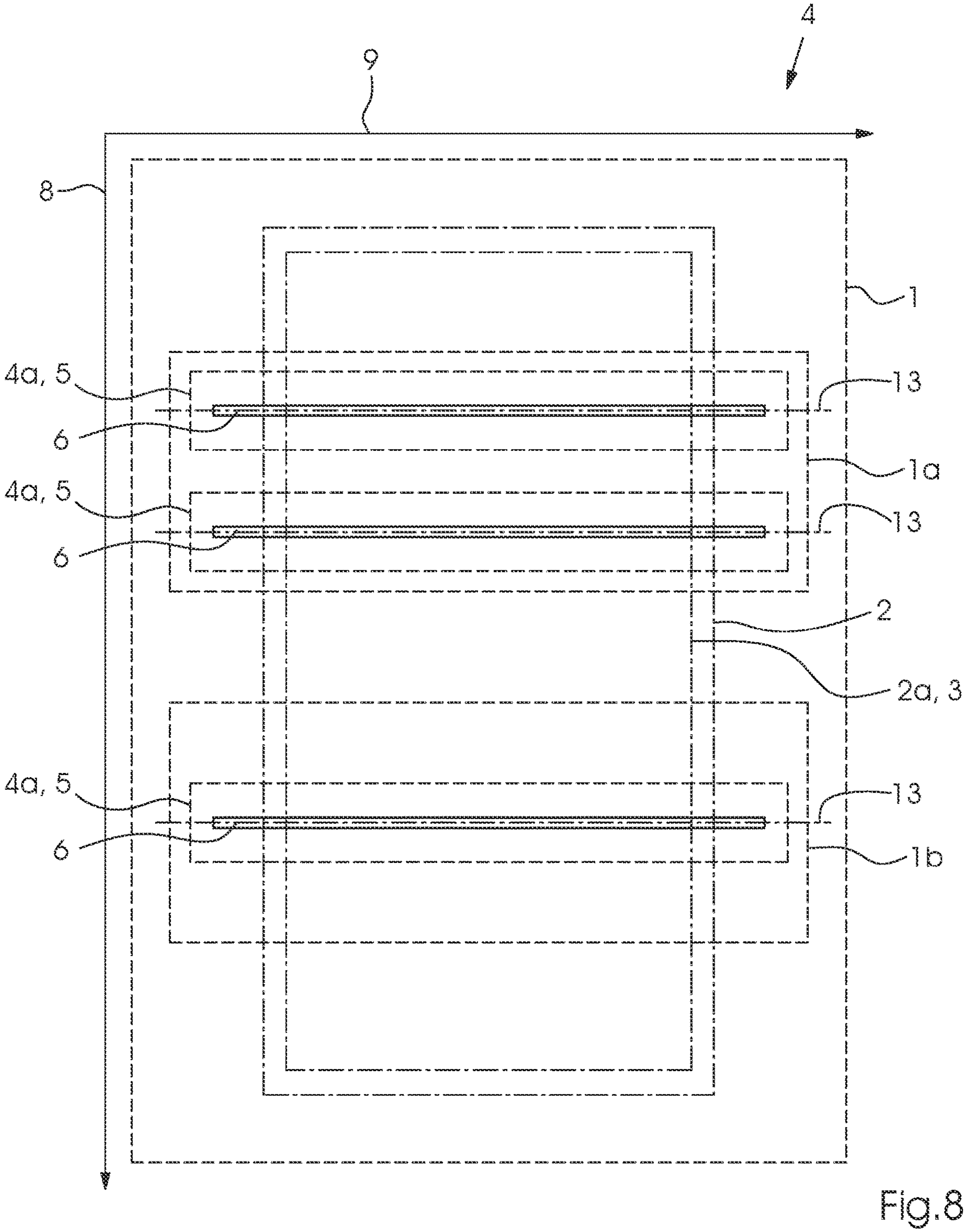
FIG. 8 is a top view of a further exemplary embodiment of the invention.

FIG. 8 is a schematic top view of a further preferred exemplary embodiment of a device of the invention. In this exemplary embodiment, the row 10 of emitters 5 (or rather an associated straight line 12) extends in parallel with the direction of transport 8 of the printing substrate 2. The longitudinal axes 13 of the flash lamps 6 extend in a direction perpendicular to the direction of transport, i.e., parallel to the transverse direction 9. In this example, multiple modules 4*a* of the device 4 with a respective (page-wide) flash lamp 6 are shown to be disposed in printing units and/or varnishing units 1*a* of the printing machine 1 and one module 4*a* with a (page-wide) flash lamp 6 is shown to be disposed in a delivery 1*b* of the printing machine 1.

The following is a summary list of reference numerals and the corresponding structure used in the above description of the invention:

1 printing machine
1*a* printing unit(s), varnishing unit(s)
1*b* delivery
2 printing substrate
2*a* printed image
3 fluid
4 device
4*a* module(s)
5 emitter
5' further emitter
6 flash lamp(s)
6*a* tubes
6*b* UV radiation
7 curved plane
7*a* carrier
8 direction of transport
9 transverse direction

10 row(s)
10' further row(s)
11 direction
12 straight line
13 longitudinal axis/axes
14 overlap
15 spacing, gap(s)
16 inclination
17 motor
18 device for controlling (potentially in closed control loop)

The invention claimed is:

1. A printing machine, comprising:

at least one printing unit configured to print UV-curable fluid on a web or on sheets of a printing substrate, wherein the web or sheets are conveyed along a direction of transport in the printing machine;

at least one device for curing the UV-curable fluid on the printing substrate, said device being disposed in the printing machine in a transverse direction transversely to the direction of transport, and being configured to generate a substantially homogeneous distribution of UV light;

said at least one device for curing the UV-curable fluid including:

an emitter disposed to irradiate the UV-curable fluid on the printing substrate, said emitter having a plurality of flash lamps disposed in a first row and a plurality of flash lamps disposed in a second row or wherein a further emitter includes a plurality of flash lamps disposed in the second row;

said flash lamps being tubes with a respective longitudinal axis in a tube direction, and said tubes in said first and second rows being disposed adjacent one another with a mutual overlap between neighboring flash lamps;

the longitudinal axes of every other one of said flash lamps being disposed on a first straight line in a direction of the row and the longitudinal axes of every further one of said flash lamps being disposed on a second straight line in the direction of the row, and said first and second straight lines being parallel to and spaced apart from one another;

said flash lamps on said first straight line being spaced apart from one another by a given distance forming gaps therebetween and said flash lamps on said second straight line being spaced apart from one another by a given distance forming gaps therebetween; and said flash lamps being offset from one another, with said flash lamps on said second straight line being disposed at the centers of the respective gaps between said flash lamps on said first straight line.

2. The printing machine according to claim 1, wherein said device is configured to generate a substantially homogeneous distribution of UV light in the direction of transport.

* * * * *